US012333826B2

(12) United States Patent
Jin

(10) Patent No.: US 12,333,826 B2
(45) Date of Patent: Jun. 17, 2025

(54) METHOD FOR DETECTING OBSTACLES AROUND VEHICLE, ELECTRONIC DEVICE AND STORAGE MEDIUM

(71) Applicant: XIAOMI EV TECHNOLOGY CO., LTD., Beijing (CN)

(72) Inventor: Cheng Jin, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 220 days.

(21) Appl. No.: 18/103,701

(22) Filed: Jan. 31, 2023

(65) Prior Publication Data

US 2024/0078811 A1 Mar. 7, 2024

(30) Foreign Application Priority Data

Sep. 2, 2022 (CN) ........................ 202211069004.6

(51) Int. Cl.
*G06V 20/58* (2022.01)
*B60Q 9/00* (2006.01)
(Continued)

(52) U.S. Cl.
CPC .............. *G06V 20/58* (2022.01); *B60Q 9/00* (2013.01); *G06T 3/4038* (2013.01); *G06T 7/13* (2017.01); *G06T 7/136* (2017.01); *G06T 7/73* (2017.01); *G06V 20/588* (2022.01); *G06T 2207/10032* (2013.01); *G06T 2207/30256* (2013.01); *G06T 2207/30261* (2013.01)

(58) Field of Classification Search
CPC ........ G06V 20/58; G06V 20/588; B60Q 9/00; G06T 3/4038; G06T 7/13; G06T 7/136; G06T 7/73; G06T 2207/10032; G06T 2207/30256; G06T 2207/30261; B60W 30/0956; B60W 40/04; B60W 50/0098; B60W 2552/50; B60W 2552/53
See application file for complete search history.

(56) References Cited

U.S. PATENT DOCUMENTS

2013/0054086 A1* 2/2013 Lo ............................ B60R 1/27
701/36
2015/0161457 A1* 6/2015 Hayakawa ............ G08G 1/166
348/46

FOREIGN PATENT DOCUMENTS

CN 104309606 A 1/2015
CN 104827966 A 8/2015
(Continued)

OTHER PUBLICATIONS

Chinese Patent Application 202211069004.6, Office Action dated Oct. 13, 2022, 8 pages.
(Continued)

*Primary Examiner* — Brian P Sweeney
(74) *Attorney, Agent, or Firm* — Cozen O'Connor

(57) ABSTRACT

A method for detecting obstacles around a vehicle includes acquiring driving information of the vehicle; acquiring the target position information of a lane line on either side of the vehicle according to the driving information of the vehicle; acquiring an alarm area corresponding to the lane line on either side according to the target position information of the lane line on either side; and judging whether an obstacle exists in the alarm area by performing an obstacle detection in the alarm area. An electronic device and a non-transitory computer readable storage medium are also provided.

19 Claims, 5 Drawing Sheets acquiring driving information of a vehicle — S101 acquiring target position information of a lane line on either side of the vehicle according to the driving information of the vehicle — S102 acquiring an alarm area corresponding to the lane line on either side according to the target position information of the lane line on either side — S103 judging whether an obstacle exists in the alarm area by performing an obstacle detection in the alarm area — S104

(51) Int. Cl.

| | |
|---|---|
| ***G06T 3/40*** | (2024.01) |
| ***G06T 3/4038*** | (2024.01) |
| ***G06T 7/13*** | (2017.01) |
| ***G06T 7/136*** | (2017.01) |
| ***G06T 7/73*** | (2017.01) |
| ***G06V 20/56*** | (2022.01) |

(56) References Cited

FOREIGN PATENT DOCUMENTS

| | | | | |
|---|---|---|---|---|
| CN | 109017570 B | * 12/2018 | ............... | B60R 1/00 |
| CN | 114537393 A | 5/2022 | | |

OTHER PUBLICATIONS

Chinese Patent Application 202211069004.6, English translation of Office Action dated Oct. 13, 2022, 7 pages.

European Patent Application No. 23155364.5, Search and Opinion dated Aug. 23, 2023, 13 pages.

* cited by examiner

METHOD FOR DETECTING OBSTACLES AROUND VEHICLE, ELECTRONIC DEVICE AND STORAGE MEDIUM

CROSS-REFERENCE TO RELATED APPLICATION

This application claims the benefit of priority to Chinese Patent Application No. 202211069004.6 filed on Sep. 2, 2022, the contents of which are incorporated herein by reference in their entireties for all purposes.

BACKGROUND

In related art, a vehicle performs a lane change warning function by detecting vehicles coming from the rear on both sides of the vehicle, and judgment of an alarm area of this function is judged by a travelling track of the vehicle.

SUMMARY

The present disclosure relates to the fields of automatic driving technologies and lane change warning technologies, in particular to a method for detecting obstacles around a vehicle, an electronic device, and a storage medium.

A first aspect of the present disclosure provides a method for detecting obstacles around a vehicle, including: acquiring, by an electronic device, driving information of the vehicle; acquiring, by the electronic device, target position information of a lane line on either side of the vehicle according to the driving information of the vehicle; acquiring, by the electronic device, an alarm area corresponding to the lane line on either side according to the target position information of the lane line on either side; and judging, by the electronic device, whether an obstacle exists in the alarm area by performing an obstacle detection in the alarm area.

A second aspect of the present disclosure proposes an electronic device, including: a processor; and a memory communicatively connected with the processor; in which, the memory is configured to store instructions executable by the processor, and the processor is configured to: acquire driving information of the vehicle; acquire target position information of a lane line on either side of the vehicle according to the driving information of the vehicle; acquire an alarm area corresponding to the lane line on either side according to the target position information of the lane line on either side; and judge whether an obstacle exists in the alarm area by performing an obstacle detection in the alarm area.

A third aspect of the present disclosure proposes a computer-readable storage medium on which computer instructions are stored, in which the computer instructions are configured to cause a computer to perform a method for detecting obstacles around a vehicle. The method includes acquiring driving information of the vehicle; acquiring target position information of a lane line on either side of the vehicle according to the driving information of the vehicle; acquiring an alarm area corresponding to the lane line on either side according to the target position information of the lane line on either side; and judging whether an obstacle exists in the alarm area by performing an obstacle detection in the alarm area.

DETAILED DESCRIPTION

Figure 1:
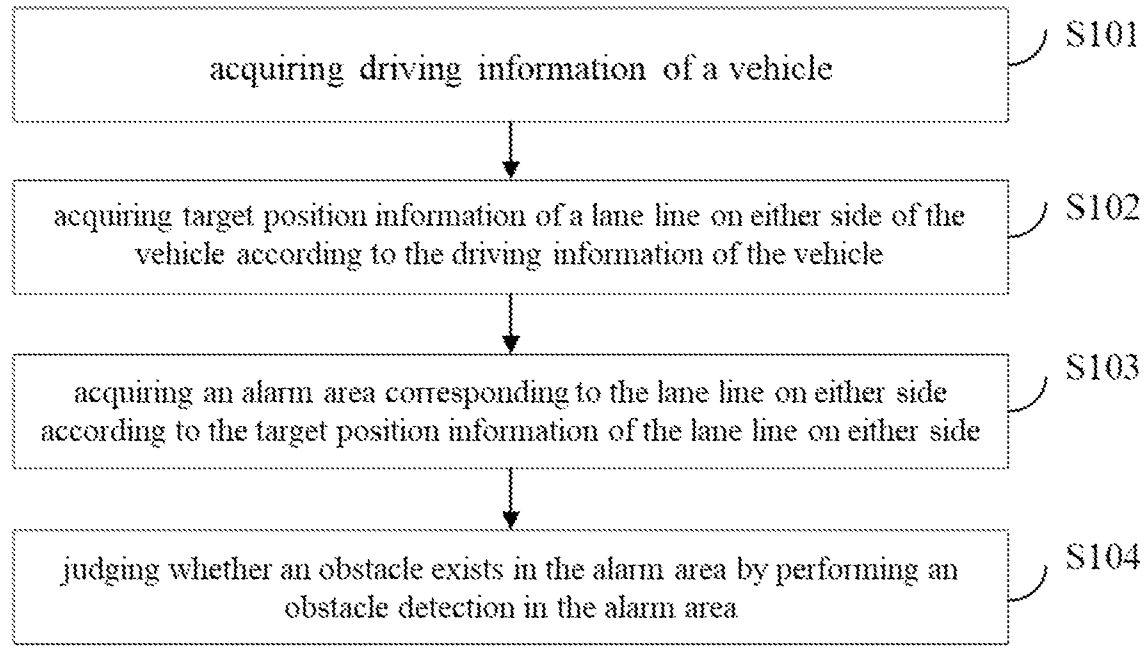
FIG. 1 is a flowchart of a method for detecting obstacles around a vehicle according to an embodiment of the present disclosure.

Embodiments of the present disclosure are described in detail below, examples of which are shown in the accompanying drawings, in which the same or similar reference numerals throughout refer to the same or similar elements or elements with the same or similar functions. The embodiments described below with reference to the accompanying drawings are illustrative and are intended to explain the present disclosure, but should not be construed as limitations on the present disclosure.

In related art, when a vehicle travels along its own lane and continuously changes lanes to a target lane, because a risk object of the lane change warning only selects the vehicles in the alarm area, it is possible to ignore a fast approaching vehicle from behind in the target lane, resulting in a dangerous accident. Therefore, improving safety of vehicle detection has become an important research directions.

A method and an apparatus for detecting obstacles around a vehicle, and an electronic device of embodiments of the present disclosure are described below with reference to the drawings.

FIG. 1 is a flowchart of a method for detecting obstacles around a vehicle according to an embodiment of the present disclosure. As shown in FIG. 1, the method includes the following steps:

At step S101, driving information of the vehicle is acquired.

In some examples, the driving information includes a plurality of types of driving data. In the embodiment of the present disclosure, a plurality of types of sensors are deployed in the vehicle, which can acquire the plurality of types of driving data. In some examples, acceleration of the vehicle can be acquired by an acceleration sensor as a type of driving data. In some examples, steering data and wheel speed data of the vehicle can be acquired as the driving information, or a yaw angle and a moving distance of the vehicle at two adjacent moments can be acquired as driving information according to the steering data, the wheel speed data and the acceleration data.

In some examples, coordinate points of positions of the vehicle at a plurality of historical moments in a vehicle coordinate system can be acquired as a type of driving data of the vehicle.

In some examples, a relative attitude between the vehicle and the ground, that is, a vehicle attitude, can be acquired by a vehicle attitude sensor as a type of driving data of the vehicle.

In some implementations, optical cameras are deployed around a body of the vehicle in all directions, and video/image data of a plurality of directions of the vehicle can be collected by the optical cameras in all directions as a type of driving data of the vehicle.

At step S102, target position information of a lane line on either side of the vehicle is acquired according to the driving information of the vehicle.

The lane line in the embodiment of the present disclosure is a lane dividing line, which is a traffic marking used to separate traffic flows traveling in the same direction. Generally, it is a dashed or solid white line, or a dashed or solid yellow line. The dashed lane line separates vehicles travelling in the same direction, and the vehicles can perform lane change and overtaking under safe conditions.

In some implementations, the driving information of the vehicle includes video/image data of a plurality of directions of the vehicle, and the target position information of the lane line can be acquired by performing image recognition of the lane line in the video/image data.

In order to improve accuracy of the target position information of the lane line, in some implementations, the driving information of the vehicle also includes the coordinate points of the positions of the vehicle at the plurality of historical moments in the vehicle coordinate system. The image recognition of the lane line in the video/image data is carried out to acquire relative distances between the vehicle and the lane line at the plurality of historical moments, and then the target position information of the lane line is acquired according to the coordinate points of the positions of the vehicle and the relative distances between the vehicle and the lane line.

At step S103, an alarm area corresponding to the lane line on either side is acquired according to the target position information of the lane line on either side.

In order to avoid dangerous accidents caused by ignoring a fast approaching vehicle from behind in a target lane when the vehicle continuously changes lanes to the target lane, in the embodiment of the present disclosure, the corresponding alarm area is acquired according to the target position information of the lane line.

Figure 2:
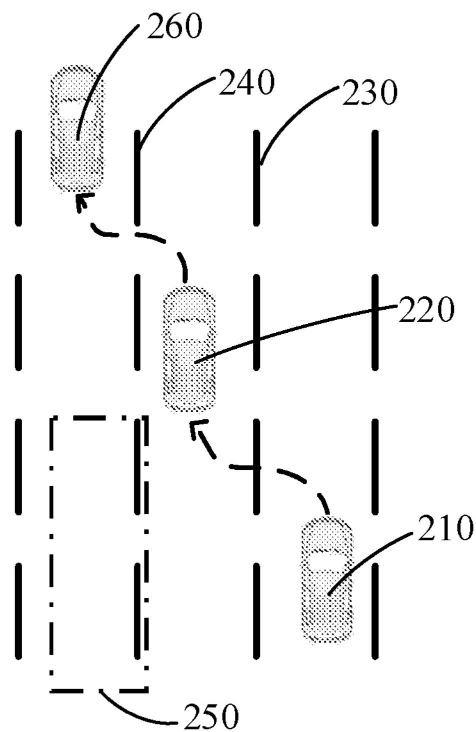
FIG. 2 is a schematic diagram of a method for detecting obstacles around a vehicle according to an embodiment of the present disclosure.

Continuous left lane change of the vehicle is taken as an example. As shown in FIG. 2, after the vehicle changes lanes for a first time, i.e., a lane change from a position 210 to a position 220, the vehicle is located between a third lane line 230 and a second lane line 240. At this time, according to the target position information of a lane line on a left side of the vehicle, i.e., the second lane line 240, the alarm area 250 is acquiring by extending the lane line to the left.

At step S104, whether an obstacle exists in the alarm area is judged by performing an obstacle detection in the alarm area.

In the embodiment of the present disclosure, the alarm area of the vehicle includes an alarm area corresponding to the lane line on either side. In some implementations, it may be the alarm area corresponding to the lane line on the left side of the vehicle, in some implementations, it may be the alarm area corresponding to the lane line on the right side of the vehicle, and in some implementations, it may also be the alarm areas corresponding to the lane lines on both sides of the vehicle, which is not limited by the present disclosure.

Continuous left lane change of the vehicle is taken as an example. As shown in FIG. 2, if the vehicle needs to change lanes for a second time, i.e., a lane change from a position 220 to a position 260, the obstacle detection in the alarm area 250 in the figure is performed to judge whether an obstacle exists in the alarm area 250. If an obstacle exists in the alarm area 250, it indicates that there may be risks during the current lane change of the vehicle.

In some examples, in the embodiment of the present disclosure, a radar monitoring apparatus can be deployed on the vehicle, and the radar monitoring apparatus can detect obstacles in the alarm area to judge whether a rear vehicle enters the alarm area.

In the embodiment of the present disclosure, the driving information of the vehicle is acquired; the target position information of the lane line on either side of the vehicle is acquired according to the driving information of the vehicle; an alarm area corresponding to the lane line on either side is acquired according to the target position information of the lane line on either side; whether an obstacle exists in the alarm area is judged by performing an obstacle detection in the alarm area. The embodiment of the present disclosure can reduce the safety risk during lane change, has good stability, can detect the fast approaching vehicle from behind in the lane in the lane change process, and improve the driving safety of the vehicle.

In order to keep the distance with a driver of the rear vehicle and further increase the driving safety, in some implementations, in response to the presence of the obstacle in the alarm area, indicating that there may be risks during the current lane change of the vehicle, a first alarm prompt is generated and an alarm prompt is given on the vehicle. In some examples, the first alarm prompt information may be visual prompt information, such as flashing of a rearview mirror light, etc.

In some implementations, a turn signal of the vehicle is acquired, and in response to determining that an obstacle exists in the alarm area pointed by the turn signal, a second alarm prompt is generated and an alarm prompt is given. That is, if there is a risk in the alarm area in the direction of the current lane change, the second alarm prompt information is generated. In some examples, the second alarm prompt information may be an audible prompt and/or a tactile prompt, such as playing a preset audio file and/or a steering wheel vibration reminder, etc.

Figure 3:
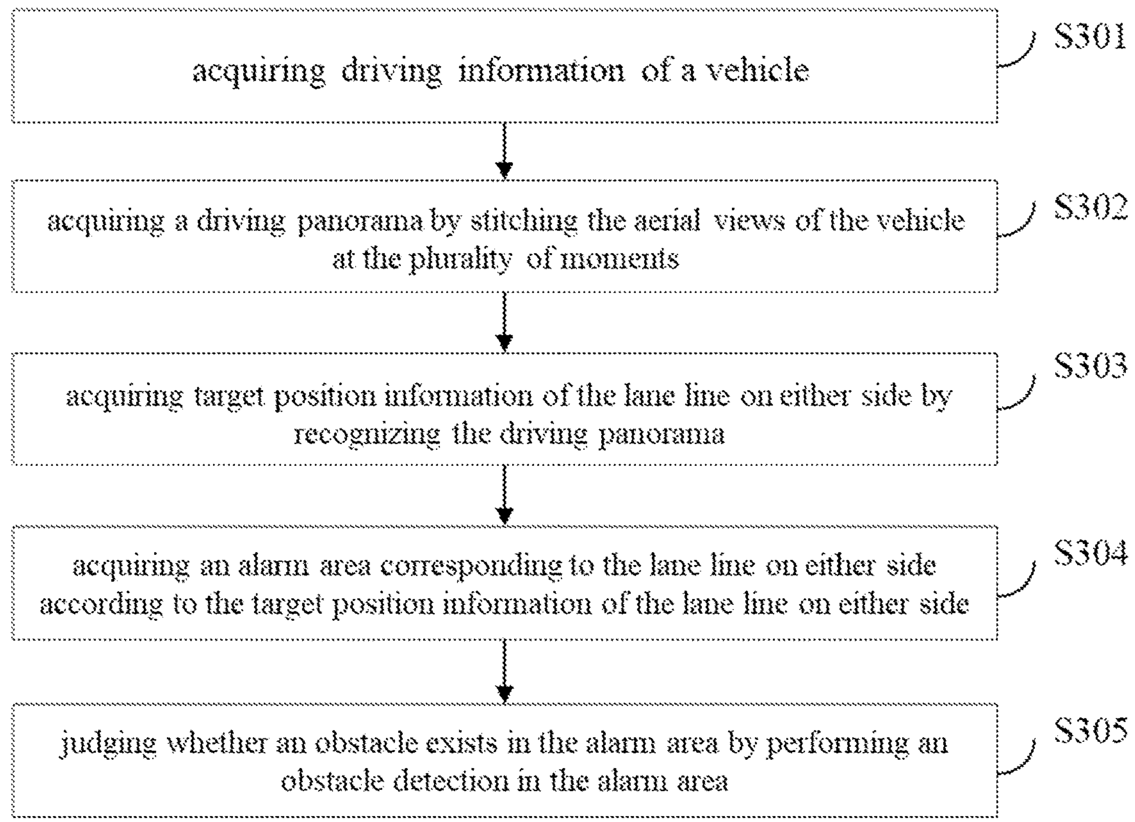
FIG. 3 is a flowchart of a method for detecting obstacles around a vehicle according to an embodiment of the present disclosure.

FIG. 3 is a flowchart of a method for detecting obstacles around a vehicle according to an embodiment of the present disclosure. As shown in FIG. 3, the method includes the following steps:

At step S301, driving information of the vehicle is acquired.

For the content of step S301, reference may be made to the related introduction in the above-mentioned embodiment, and it will not be repeated here.

It should be noted that the driving information includes aerial views of the vehicle at a plurality of moments, for example, aerial views including a current moment and N historical moments. Where N is an integer greater than 2.

At step S302, a driving panorama is acquired by stitching the aerial views of the vehicle at the plurality of moments.

In the embodiment of the present disclosure, an image stitching processing is performed on the aerial views, and the image stitching technology is a technology of stitching several overlapping images (which may be acquired at different moments, from different perspectives or by different sensors) into a seamless panorama or high-resolution image. In the embodiment of the present disclosure, the driving panorama is acquired by performing the image stitching processing on the aerial views at the different moments.

At step S303, the target position information of the lane line on either side is acquired by recognizing the driving panorama.

Candidate position information of the lane line on either side in an image coordinate system is acquired by performing edge detection and/or binarization processing on the driving panorama. Because an direction of shooting the aerial view is fixed, a current position of the vehicle in the image coordinate system can be acquired, for example, it can be a preset coordinate position, and then coordinate system conversion can be carried out in combination with the candidate position information to acquire the target position information of the lane line on either side in the first coordinate system, which is a coordinate system of the position of the vehicle at a current moment.

In some examples, in the embodiment of the present disclosure, the first coordinate system takes the position of the vehicle at the current moment as a coordinate origin, an opposite direction of a vehicle travelling direction as a longitudinal coordinate axis direction, and a right direction of the vehicle travelling direction as a transverse coordinate axis direction.

At step S304, an alarm area corresponding to the lane line on either side is acquired according to the target position information of the lane line on either side.

At step S305, whether an obstacle exists in the alarm area is judged by performing an obstacle detection in the alarm area.

For the contents of steps S304 and S305, reference may be made to the related introduction in the above embodiment with regard to steps S103 and S104, respectively, and the details will not be repeated here.

In the embodiment of the present disclosure, aerial views at a plurality of moments in the driving information are stitched to acquire the driving panorama, and then the driving panorama is recognized to acquire the target position information of the lane line on either side. The present disclosure can reduce the safety risk during lane change, has good stability, and can detect the fast vehicle approaching from behind in the lane in the lane change process, thus improving the driving safety of the vehicle.

Figure 4:
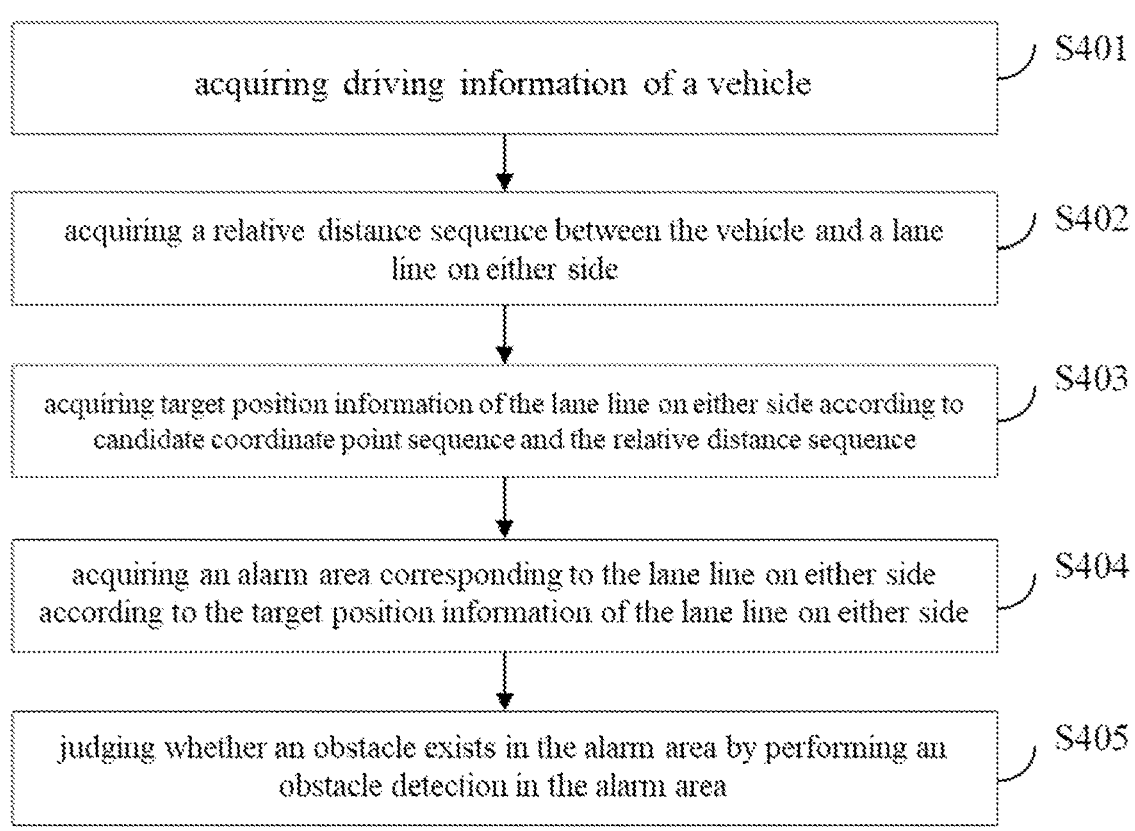
FIG. 4 is a flowchart of a method for detecting obstacles around a vehicle according to an embodiment of the present disclosure.

FIG. 4 is a flowchart of a method for detecting obstacles around a vehicle according to an embodiment of the present disclosure. As shown in FIG. 4, the method includes the following steps:

At step S401, driving information of the vehicle is acquired.

For the content of step S401, reference may be made to the related introduction in the above-mentioned embodiment, and it will not be repeated here.

It should be noted that the driving information includes the candidate coordinate point sequence of the vehicle in a second coordinate system, which is a coordinate system of the position of the vehicle at a previous moment, and the candidate coordinate point sequence includes candidate coordinate points of the vehicle at a plurality of historical moments.

In some examples, the driving information also includes a yaw angle and a moving distance of the vehicle at the current moment.

At step S402, a relative distance sequence between the vehicle and the lane line on either side is acquired.

Figure 5:
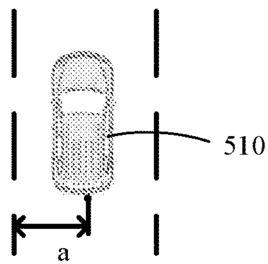
FIG. 5 is a schematic diagram of a method for detecting obstacles around a vehicle according to an embodiment of the present disclosure.

For example, the lane line on either side is a lane line on a left side of the vehicle, as shown in FIG. 5, an image acquisition apparatus can be deployed at a rear of the vehicle 510 to acquire an rear image, and then the image can be recognized to acquire a minimum distance a from a middle point of the rear of the vehicle 510 to the lane line, where a is a number greater than 2.

Figure 6:
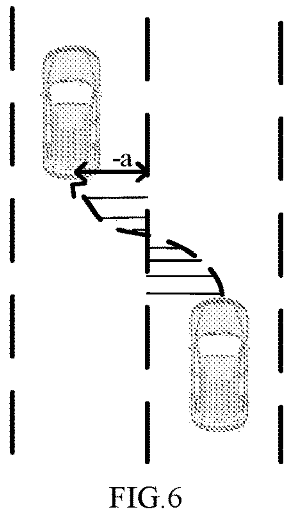
FIG. 6 is a schematic diagram of a method for detecting obstacles around a vehicle according to an embodiment of the present disclosure.

For each lane line, first relative distances between the vehicle and the lane line at a plurality of historical moments and a second relative distance between the vehicle and the lane line at a current moment are acquired, in which the relative distance is a minimum distance between the vehicle and the lane line, and in some examples, in the embodiment of the present disclosure, it refers to a minimum distance from the middle point of the rear of the vehicle to the lane line. In some examples, the second relative distance and a plurality of first relative distances are sorted according to the time sequence to acquire a relative distance sequence. For example, the vehicle changes lanes to the left and the lane line on either side is a second lane line. As shown in FIG. 6, the current moment is the moment when the lane change is completed, and the second relative distance is −a, and the relative position is directional. Therefore, in the embodiment of the present disclosure, the first relative distances are −a+1, −a+2, . . . , −2, −1, 0, 1, 2, . . . , a−2, a−1, a, then the relative distance sequence is [−a, −a+1, −a+2, . . . , −2, −1, 0, 1, 2, . . . , a−2, a−1, a].

At step S403, according to the candidate coordinate point sequence and the relative distance sequence, the target position information of the lane line on either side is acquired.

According to the yaw angle and the moving distance, the target coordinate point sequence of the vehicle in the first coordinate system is acquired by performing coordinate system conversion on the candidate coordinate point sequence. When the position of the vehicle moves, the following formula can be used to convert the candidate coordinate points:

$$x(i)=x(i-1)-y(i-1)*(\theta)+d$$

$$y(i)=y(i-1)+x(i-1)*(\theta)+d*(\theta/2)$$

Where x(i−1) and y(i−1) are abscissa and ordinate of the candidate coordinate points, and x(i) and y(i) are abscissa and ordinate of the target coordinate point after coordinate conversion; θ is the yaw angle, and d is the moving distance.

According to the above formula, the candidate coordinate points in the candidate coordinate point sequence can be converted to acquire the target coordinate point sequence of the vehicle in the first coordinate system. For example, assuming that the position of the vehicle is recorded once every is, the coordinates of point A and point B are (0.5,0) and (3,0) respectively at an initial moment to, and the vehicle moves 1 m forward and 1 m to the left at a next second ti. Then the coordinates recorded at ti are the transformed A-point coordinates (1.5,1) and B-point coordinates (4,1) at the previous moment (assuming that the right is the positive direction of horizontal axis and the rear is the positive direction of vertical axis), and the corresponding A-point coordinates (0.5,0) and B-point coordinates (3,0) at the current moment.

In the embodiment of the present disclosure, the relative position change between the vehicle and the lane line on either side corresponds to the relative distance sequence, and the position change of the vehicle corresponds to the target coordinate point sequence, hence the target position information of the lane line on either side can be acquired according to a difference between the target coordinate point sequence and the relative distance sequence.

At step S404, an alarm area corresponding to the lane line on either side is acquired according to the target position information of the lane line on either side.

At step S405, whether an obstacle exists in the alarm area is judged by performing an obstacle detection in the alarm area.

For the contents of steps S404 and S405, reference may be made to the related introduction in the above embodiment, and the details will not be repeated here.

In the embodiment of the present disclosure, the relative distance sequence between the vehicle and the lane line on either side is acquired, and the target position information of the lane line on either side is acquired according to the candidate coordinate point sequence and the relative distance sequence. The present disclosure can reduce the safety risk during lane change, has good stability, and can detect the vehicle fast approaching from behind in the lane in the lane change process, thus improving the driving safety of the vehicle.

Figure 7:
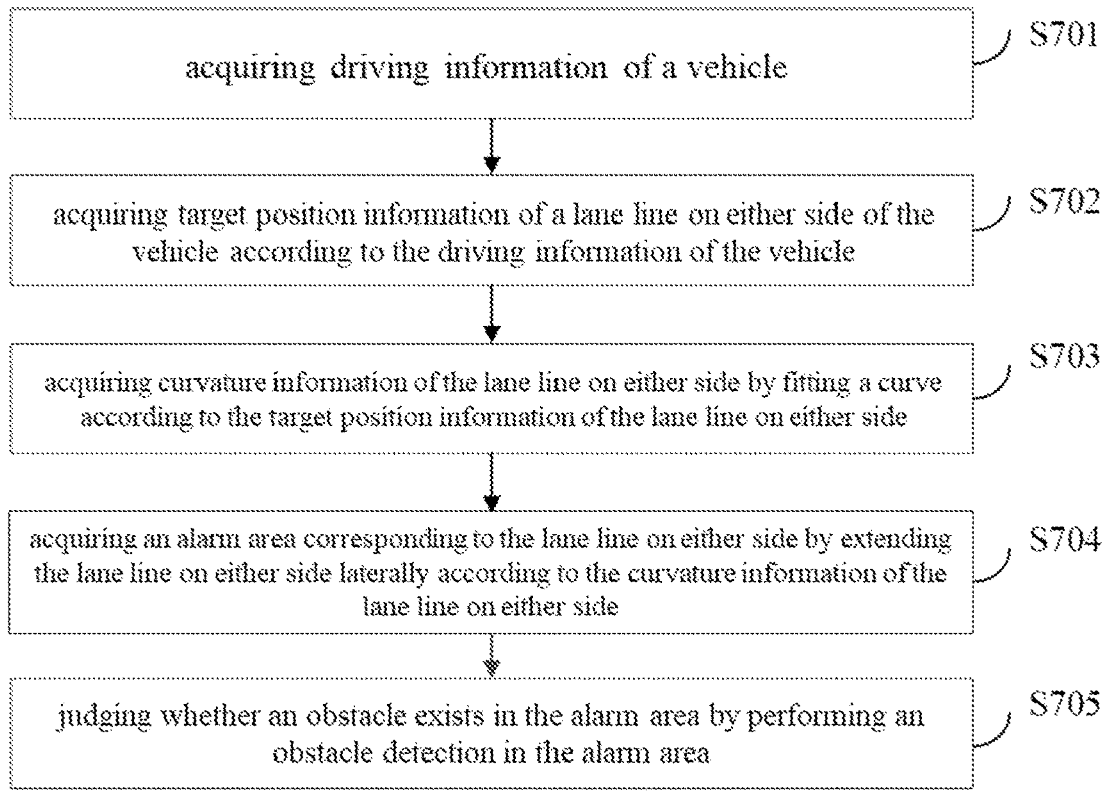
FIG. 7 is a flowchart of a method for detecting obstacles around a vehicle according to an embodiment of the present disclosure.

FIG. 7 is a flowchart of a method for detecting obstacles around a vehicle according to an embodiment of the present disclosure. As shown in FIG. 7, the method includes the following steps:

At step S701, driving information of the vehicle is acquired.

At step S702, target position information of a lane line on either side of the vehicle is acquired according to the driving information of the vehicle.

For the contents of steps S701 and S702, reference may be made to the related introduction in the above embodiment, and the details will not be repeated here.

At step S703, curvature information of the lane line on either side is acquired by fitting a curve according to the target position information of the lane line on either side.

The curvature information of the lane line on either side is acquired by fitting a curve according to the target position information of the lane line on either side and deriving the fitted curve.

At step S704, the alarm area corresponding to the lane line on either side is acquired by extending the lane line on either side laterally according to the curvature information of the lane line on either side.

In some implementations, the alarm area corresponding to the lane line can be a regular rectangle, and a straight line of the alarm area is parallel to the lane line. According to the target position information of the lane line on either side, a width between two adjacent lane lines is acquired. The lane line on either side is extended laterally according to the curvature information of the lane line on either side and the width between two adjacent lane lines. That is to say, according to the curvature information of the lane line on either side, the lane line on either side is laterally extended, an extension width is the width between two adjacent lane lines, and the extension direction is an direction pointing from the vehicle to the lane line.

Figure 8:
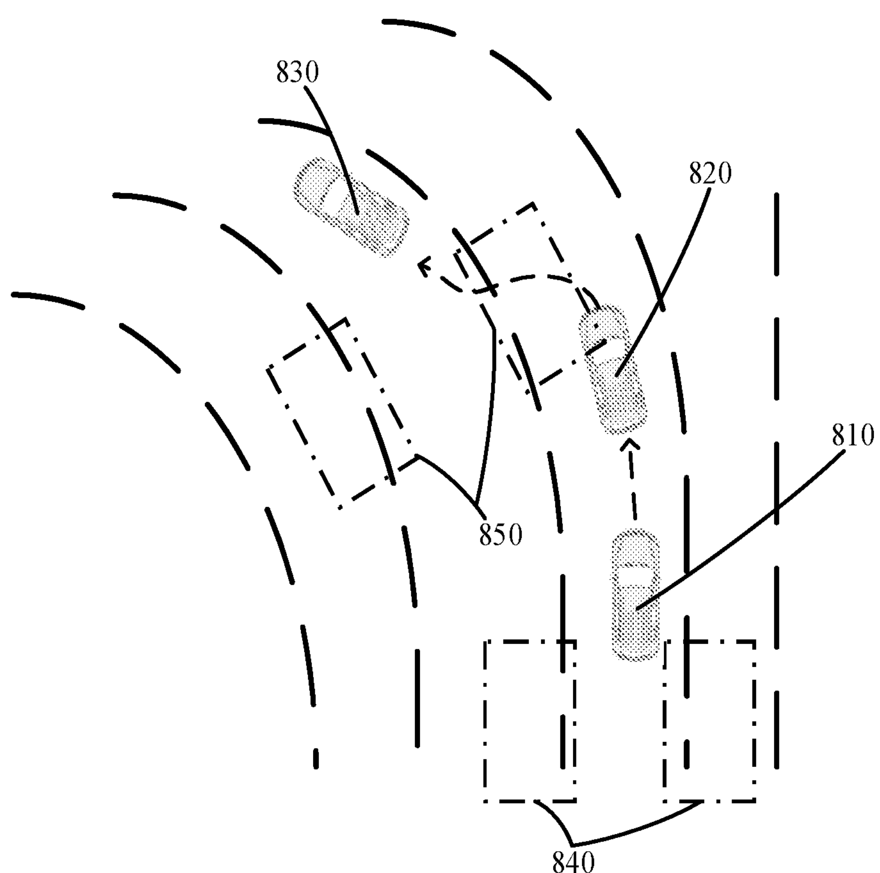
FIG. 8 is a schematic diagram of a method for detecting obstacles around a vehicle according to an embodiment of the present disclosure.

As shown in FIG. 8, the vehicle normally travels from a position 810 to a position 820, and then changes lanes to the left from the position 820 to a position 830, where the alarm area of the position 810 can be alarm areas 840 corresponding to two adjacent lane lines of the vehicle, and the alarm area of the position 830 can be alarm areas 850 corresponding to two adjacent lane lines of the vehicle.

At step S705, whether an obstacle exists in the alarm area is judged by performing an obstacle detection in the alarm area.

For the content of step S705, reference may be made to the related introduction in the above-mentioned embodiment, which is not repeated here.

In the embodiment of the present disclosure, the curvature information of the lane line on either side is acquired by fitting a curve according to the target position information of the lane line on either side, and the alarm area corresponding to the lane line on either side is acquired by extending the lane line on either side laterally according to the curvature information of the lane line on either side. The present disclosure can reduce the safety risk during lane change, has good stability, and can detect the fast approaching vehicle from behind in the lane in the lane change process, thus improving the driving safety of the vehicle.

Figure 9:
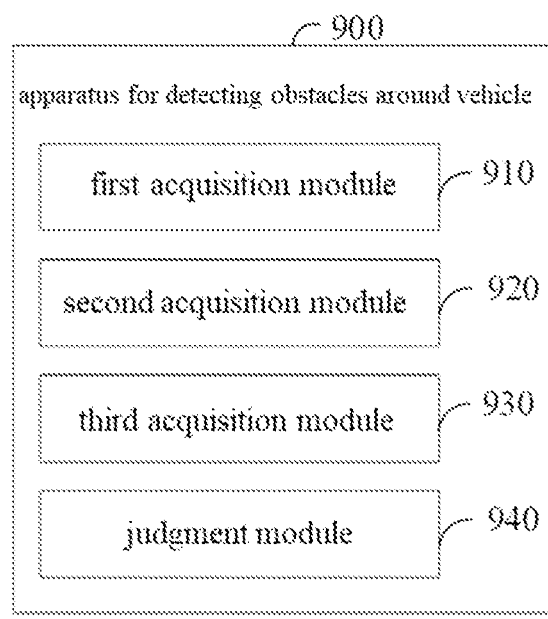
FIG. 9 is a structural block diagram of an apparatus for detecting obstacles around a vehicle according to an embodiment of the present disclosure.

FIG. 9 is a structural block diagram of an apparatus for detecting obstacles around a vehicle proposed in the present disclosure. As shown in FIG. 9, the apparatus 900 for detecting obstacles around the vehicle includes: a first acquisition module 910, configured to acquire driving information of the vehicle; a second acquisition module 920, configured to acquire target position information of a lane line on either side of the vehicle according to the driving information of the vehicle; a third acquisition module 930, configured to acquire an alarm area corresponding to the lane line on either side according to the target position information of the lane line on either side; and a judgment module 940 is configured to judge whether an obstacle exists in the alarm area by performing an obstacle detection in the alarm area.

In some implementations, the driving information includes aerial views of the vehicle at a plurality of moments, and the plurality of moments include a current moment. The second acquisition module 920 is further configured to acquire a driving panorama by stitching the aerial views of the vehicle at the plurality of moments; and acquire the target position information of the lane line on either side by recognizing the driving panorama.

In some implementations, the second acquisition module 920 is further configured to acquire candidate position information of the lane line on either side in an image coordinate system by performing edge detection and/or binarization processing on the driving panorama; and acquire, the target position information of the lane line on either side in a first coordinate system by performing coordinate system conversion according to the candidate position information, the first coordinate system being a coordinate system of the position of the vehicle at the current moment.

In some implementations, the driving information includes the candidate coordinate point sequence of the vehicle in the second coordinate system, the second coordinate system is a coordinate system of the position of the vehicle at a previous moment, and the candidate coordinate point sequence includes candidate coordinate points of the vehicle at a plurality of historical moments. The second acquisition module 920 is further configured to acquire the relative distance sequence between the vehicle and the lane line on either side; and acquire the target position information of the lane line on either side according to the candidate coordinate point sequence and the relative distance sequence.

In some implementations, the driving information also includes a yaw angle and a moving distance of the vehicle at the current moment, and the second acquisition module 920 is further configured to: acquire a target coordinate point sequence of the vehicle in the first coordinate system by performing coordinate system conversion on the candidate coordinate point sequence according to the yaw angle and the moving distance; and acquire the target position information of the lane line on either side according to a difference between the target coordinate point sequence and the relative distance sequence.

In some implementations, the second acquisition module 920 is further configured to for each lane line, acquire first relative distances between the vehicle and the lane line at a plurality of historical moments and a second relative distance between the vehicle and the lane line at a current moment, the relative distance being the minimum distance between the vehicle and the lane line; and acquire a relative distance sequence according to first relative distances and the second relative distance.

In some implementations, it is characterized in that the third acquisition module 930 is further configured to: acquire curvature information of the lane line on either side by fitting a curve according to the target position information of the lane line on either side; and acquire the alarm area corresponding to the lane line on either side by extending the lane line on either side laterally according to the curvature information of the lane line on either side.

In some implementations, the third acquisition module 930 is further configured to acquire a width between two adjacent lane lines according to the target position information of the lane line on either side; and extend the lane line on either side laterally according to the curvature information of the lane line on either side and the width between two adjacent lane lines.

In some implementations, the judgment module 940 is further configured to generate a first alarm prompt information and give an alarm prompt in response to presence of an obstacle in the alarm area.

In some implementations, the judgment module 940 is further configured to acquire a turn signal of the vehicle; and generate second alarm prompt information and give an alarm prompt in response to determining that the obstacle exists in the alarm area pointed by the turn signal.

The embodiment of the disclosure can reduce the safety risk during lane change, has good stability, can detect the fast approaching vehicle from behind in the lane in the lane change process, and improve the driving safety of the vehicle.

Based on the same concept, embodiments of the present disclosure also provide an electronic device.

Figure 10:
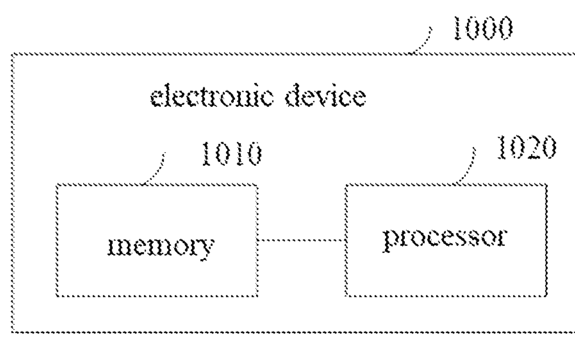
FIG. 10 is a structural schematic diagram of an electronic device according to an embodiment of the present disclosure.

FIG. 10 is a schematic structural view of an electronic device provided by an embodiment of the present disclosure. As shown in FIG. 10, the electronic device 1000 includes a memory 1010, a processor 1020, and a computer program product stored in the memory 1010 and executable by the processor 1020. When the processor executes the computer program, the aforementioned method for detecting obstacles around the vehicle is realized.

It should be understood by those skilled in the art that embodiments of the present disclosure can be provided as methods, systems, or computer program products. Therefore, the present disclosure can take the form of an entirely hardware embodiment, an entirely software embodiment, or an embodiment combining software and hardware aspects. Furthermore, the present disclosure may take the form of a computer program product implemented on one or more computer usable storage media (including but not limited to disk storage, optical storage, etc.) containing computer usable program codes therein.

The present disclosure is described with reference to flowcharts and/or block diagrams of methods, apparatuses (systems), and computer program products according to embodiments of the disclosure. It should be understood that each process and/or block in flowchart and/or block diagram, and combinations of processes and/or blocks in flowchart and/or block diagram can be realized by computer program instructions. These computer program instructions may be provided to the processor of a general-purpose computer, a special-purpose computer, an embedded processor or other programmable data processing equipment to produce a machine, so that the instructions executed by the processor of the computer or other programmable data processing equipment produce means for implementing the functions specified in one or more processes in the flowchart and/or one or more blocks of the block diagram.

These computer program instructions can also be stored in a computer-readable memory that can direct a computer or other programmable data processing equipment to work in a specific way, so that the instructions stored in the computer-readable memory produce an article of manufacture including instruction means that implement the functions specified in one or more processes of the flowchart and/or one or more blocks of the block diagrams.

These computer program instructions can also be loaded on a computer or other programmable data processing equipment, so that a series of operation steps are executed on the computer or other programmable equipment to produce a computer-implemented process, so that the instructions executed on the computer or other programmable equipment provide steps for realizing the functions specified in one or more processes of the flowchart and/or one or more blocks of the block diagram.

Based on the same concept, embodiments of the present disclosure also provide a computer readable storage medium on which computer instructions are stored, in which the computer instructions are configured to cause a computer to execute the method for detecting obstacles around the vehicle in the above embodiments.

Based on the same concept, embodiments of the present disclosure also provide a computer program product, including a computer program, which, when executed by a processor, implement the method for detecting obstacles around the vehicle in the above embodiments.

It should be noted that in the claims, any reference signs between parentheses shall not be construed as limitations on the claims. The word "comprising" does not exclude the presence of components or steps not listed in a claim. The word "a" or "an" preceding a component does not exclude the presence of a plurality of such components. The present disclosure can realized by means of hardware including several different components and by means of a suitably programmed computer. In the unit claim enumerating several means, several of these means can be embodied by the same item of hardware. The use of the words first, second, third, etc. does not indicate any order. These words can be interpreted as names.

In addition, the terms "first" and "second" are only used for descriptive purposes, and cannot be understood as indicating or implying relative importance or implicitly indicating the number of indicated technical features. Therefore, the features defined as "first" and "second" may include one or more of these features explicitly or implicitly. In the description of the present disclosure, "a plurality of" means two or more, unless otherwise specifically defined.

Although the preferred embodiments of the present disclosure have been described, those skilled in the art can make additional changes and modifications to these embodiments once they know the basic creative concepts. Therefore, the appended claims are intended to be interpreted as including the preferred embodiments and all changes and modifications that fall within the scope of this disclosure.

Obviously, those skilled in the art can make various changes and modifications to the present disclosure without departing from the spirit and scope of the present disclosure. Thus, if these modifications and variations of this disclosure fall within the scope of the claims of the present disclosure and their technical equivalents, the present disclosure is also intended to include these modifications and variations.

What is claimed is:

1. A method for detecting obstacles around a vehicle, comprising:

acquiring driving information of the vehicle; acquiring target position information of a lane line on either side of the vehicle according to the driving information of the vehicle;

acquiring an alarm area corresponding to the lane line on either side according to the target position information of the lane line on either side; and judging whether an obstacle exists in the alarm area by performing an obstacle detection in the alarm area;

acquiring a turn signal of the vehicle; and generating alarm prompt information and giving an alarm prompt, in response to determining that the obstacle exists in the alarm area pointed by the turn signal.

2. The method according to claim 1, wherein the driving information comprises aerial views of the vehicle at a plurality of moments, and acquiring target position information of a lane line on either side of the vehicle according to the driving information of the vehicle comprises:

acquiring a driving panorama by stitching the aerial views of the vehicle at the plurality of moments; and acquiring the target position information of the lane line on either side by recognizing the driving panorama.

3. The method according to claim 2, wherein acquiring the target position information of the lane line on either side by recognizing the driving panorama comprise:

acquiring candidate position information of the lane line on either side in an image coordinate system by performing edge detection and/or binarization processing on the driving panorama; and acquiring the target position information of the lane line on either side in a first coordinate system by performing coordinate system conversion according to the candidate position information, wherein the first coordinate system is a coordinate system of a position of the vehicle at a current moment.

4. The method according to claim 1, wherein the driving information comprises a candidate coordinate point sequence of the vehicle in a second coordinate system, the second coordinate system is a coordinate system of a position of the vehicle at a previous moment, the candidate coordinate point sequence comprises candidate coordinate points of the vehicle at a plurality of historical moments, and acquiring target position information of a lane line on either side of the vehicle according to the driving information of the vehicle comprises:

acquiring a relative distance sequence between the vehicle and the lane line on either side; and acquiring the target position information of the lane line on either side according to the candidate coordinate point sequence and the relative distance sequence.

5. The method according to claim 4, wherein the driving information further comprises a yaw angle and a moving distance of the vehicle at a current moment, and acquiring the target position information of the lane line on either side according to the candidate coordinate point sequence and the relative distance sequence comprises:

acquiring a target coordinate point sequence of the vehicle in a first coordinate system by performing coordinate system conversion on the candidate coordinate point sequence according to the yaw angle and the moving distance; and acquiring the target position information of the lane line on either side according to difference between the target coordinate point sequence and the relative distance sequence.

6. The method according to claim 4, wherein acquiring a relative distance sequence between the lane line and the vehicle comprises:

for each lane line, acquiring first relative distances between the vehicle and the lane line at the plurality of historical moments and a second relative distance between the vehicle and the lane line at a current moment, wherein a relative distance is a minimum distance between the vehicle and the lane line; and acquiring the relative distance sequence according to the first relative distances and the second relative distance.

7. The method according to claim 1, wherein acquiring an alarm area corresponding to the lane line on either side according to the target position information of the lane line on either side comprises:

acquiring curvature information of the lane line on either side by fitting a curve according to the target position information of the lane line on either side; and acquiring the alarm area corresponding to the lane line on either side by extending the lane line on either side laterally according to the curvature information of the lane line on either side.

8. The method according to claim 7, wherein extending the lane line on either side laterally according to the curvature information of the lane line on either side comprises:

acquiring a width between two adjacent lane lines according to the target position information of the lane line on either side; and extending the lane line on either side laterally according to the curvature information of the lane line on either side and the width between two adjacent lane lines.

9. The method according to claim 1, further comprising:

generating additional alarm prompt information and giving an additional alarm prompt, in response to presence of the obstacle in the alarm area.

10. An electronic device, comprising:

a processor; and a memory communicatively connected with the processor; wherein, the memory is configured to store instructions executable by the processor, and the processor is configured to:

acquire driving information of a vehicle;

acquire target position information of a lane line on either side of the vehicle according to the driving information of the vehicle;

acquire an alarm area corresponding to the lane line on either side according to the target position information of the lane line on either side;

judge whether an obstacle exists in the alarm area by performing an obstacle detection in the alarm area;

acquire a turn signal of the vehicle; and generate second alarm prompt information and give an alarm prompt, in response to determining that the obstacle exists in the alarm area pointed by the turn signal.

11. The electronic device according to claim 10, wherein the driving information comprises aerial views of the vehicle at a plurality of moments, and the processor is configured to:

acquire a driving panorama by stitching the aerial views of the vehicle at the plurality of moments; and acquire the target position information of the lane line on either side by recognizing the driving panorama.

12. The electronic device according to claim 11, wherein the processor is configured to:

acquire candidate position information of the lane line on either side in an image coordinate system by performing edge detection and/or binarization processing on the driving panorama; and acquire the target position information of the lane line on either side in a first coordinate system by performing coordinate system conversion according to the candidate position information, wherein the first coordinate system is a coordinate system of a position of the vehicle at a current moment.

13. The electronic device according to claim 10, wherein the driving information comprises a candidate coordinate point sequence of the vehicle in a second coordinate system, the second coordinate system is a coordinate system of a position of the vehicle at a previous moment, the candidate coordinate point sequence comprises candidate coordinate points of the vehicle at a plurality of historical moments, and the processor is configured to:

acquire a relative distance sequence between the vehicle and the lane line on either side; and acquire the target position information of the lane line on either side according to the candidate coordinate point sequence and the relative distance sequence.

14. The electronic device according to claim 13, wherein the driving information further comprises a yaw angle and a moving distance of the vehicle at a current moment, and the processor is configured to:

acquire a target coordinate point sequence of the vehicle in a first coordinate system by performing coordinate system conversion on the candidate coordinate point sequence according to the yaw angle and the moving distance; and acquire the target position information of the lane line on either side according to a difference between the target coordinate point sequence and the relative distance sequence.

15. The electronic device according to claim 13, wherein the processor is configured to:

for each lane line, acquire first relative distances between the vehicle and the lane line at the plurality of historical moments and a second relative distance between the vehicle and the lane line at a current moment, wherein a relative distance is a minimum distance between the vehicle and the lane line; and acquire the relative distance sequence according to the first relative distances and the second relative distance.

16. The electronic device according to claim 10, wherein the processor is configured to:

acquire curvature information of the lane line on either side by fitting a curve according to the target position information of the lane line on either side; and acquire the alarm area corresponding to the lane line on either side by extending the lane line on either side laterally according to the curvature information of the lane line on either side.

17. The electronic device according to claim 16, wherein the processor is configured to:

acquire a width between two adjacent lane lines according to the target position information of the lane line on either side; and extend the lane line on either side laterally according to the curvature information of the lane line on either side and the width between two adjacent lane lines.

18. The electronic device according to claim 10, wherein the processor is configured to:

generate first alarm prompt information and give an alarm prompt, in response to presence of the obstacle in the alarm area.

19. A non-transitory computer readable storage medium having computer instructions stored thereon, wherein the computer instructions are configured to cause a computer to perform a method for detecting obstacles around a vehicle, comprising:

acquiring driving information of the vehicle;

acquiring target position information of a lane line on either side of the vehicle according to the driving information of the vehicle;

acquiring an alarm area corresponding to the lane line on either side according to the target position information of the lane line on either side;

judging whether an obstacle exists in the alarm area by performing an obstacle detection in the alarm area;

acquiring a turn signal of the vehicle; and generating alarm prompt information and giving an alarm prompt, in response to determining that the obstacle exists in the alarm area pointed by the turn signal.

* * * * *